F. BUCHERER.
POWER TRANSMITTING MECHANISM.
APPLICATION FILED NOV. 22, 1907.
910,901.  Patented Jan. 26, 1909.
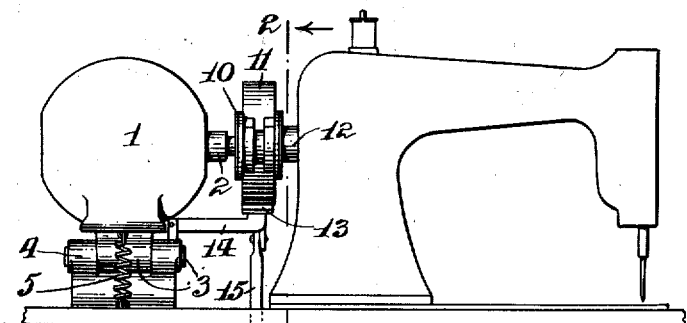
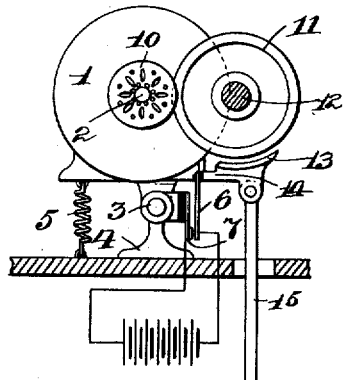
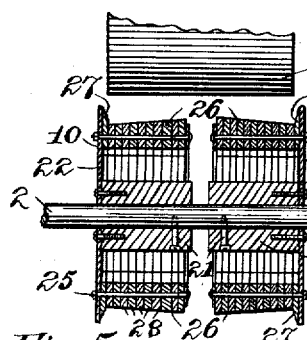
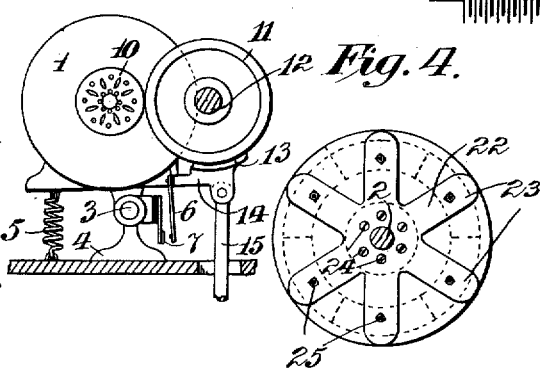
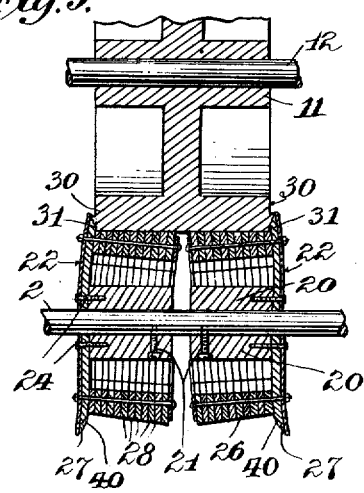
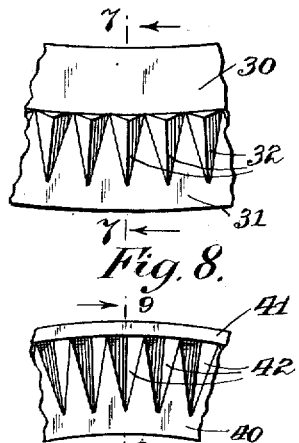
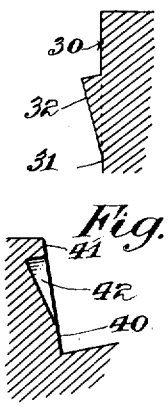
Attest:
May Hughes
Alan C. McDonnell
Inventor:
Frederick Bucherer
by William R. Baird
his Atty.

UNITED STATES PATENT OFFICE.

FREDERICK BUCHERER, OF BAYONNE, NEW JERSEY.

POWER-TRANSMITTING MECHANISM.

No. 910,901.　　　Specification of Letters Patent.　　　Patented Jan. 26, 1909.

Application filed November 22, 1907. Serial No. 403,277.

*To all whom it may concern:*

Be it known that I, FREDERICK BUCHERER, a citizen of the United States, residing at Bayonne, in the county of Hudson and State of New Jersey, have invented certain new and useful Improvements in Power-Transmitting Mechanisms, of which the following is a specification.

My invention relates to power transmitting mechanism and its novelty consists in the construction and adaptation of the parts as will be more fully hereinafter pointed out.

In United States Letters Patent No. 873,838, granted to me December 17, 1907, I described a power transmitting mechanism comprising two pulleys, a driving pulley and a driven pulley, the former provided with a lateral annular flange and a yielding surface, whereby pressure of such surface against the driven pulley caused the lateral flange to project inwardly to engage such pulley, by frictional contact.

The subject matter of the present application is an improvement upon the invention described in the patent above referred to, the pulleys being provided with similarly placed projections and indentations whereby a locking engagement ensues between them when the contact between the pulleys becomes close.

It also comprises means for energizing the motor by which the driving pulley is actuated and simultaneously disengaging a brake normally in position to act against the driven pulley to hold it at rest.

In the drawings, Figure 1 is an elevation of a sewing machine, a motor and a form of power transmitter embodying my invention; Fig. 2 is an end view thereof looking to the left from the plane of the line 2—2 in Fig. 1; Fig. 3 is a central section of one form of the driving pulley and Fig. 4 is an end view thereof; Fig. 5 is a central section of a modified form of the driving pulley and of the lower portion of the driven pulley; Fig. 6 is an enlarged elevation of a part of the driven pulley shown in Fig. 5 along its engaging rim, and Fig. 7 is a section thereof on the plane of the line 7—7 in Fig. 6. Fig. 8 is an enlarged elevation of a part of the driving pulley shown in Fig. 5 along its engaging rim and Fig. 9 is a section thereof on the plane of the line 9—9 in Fig. 8, and Fig. 10 is a view similar to Fig. 2 showing the pulleys disengaged and the switch open.

In the drawings, 1 represents a motor which may be of any approved style or construction, but which is preferably of an ordinary type of electrical motor, and 2 is its shaft. It is provided with a base 3 mounted to oscillate in standards 4 and its base is so arranged with respect to these standards that its center of gravity is beyond, or outside of, the center line of the base, or to the left of this center line when the parts are in the positions shown in Figs. 2 and 10. A spring 5 serves to assist the force of gravity to draw downwardly that portion of the motor, or motor frame, to which it is attached. Depending from the motor is a switch arm 6 adapted to contact with a conductor 7 leading to a source of suitable electrical energy (not shown) when the motor is in operative position (as shown in Fig. 2), but swung away and out of contact therewith when the parts are not in operative position (as shown in Fig. 10).

10 is a driving pulley mounted on a shaft 2 of the motor and 11 is the driven pulley which is mounted on the shaft 12 of the machine adapted to be actuated thereby. In the drawings I have represented this machine as a sewing machine, but it may be a printing press, or any other light running machine.

13 is a brake shoe mounted on a bracket 14 secured to, or made integral with, the motor frame and moving in unison with the switch bar 6, or rigidly secured to it.

15 is a dependent rod hinged to the bracket 14 and terminating at its lower extremity in a pedal or hand-hold (not shown) or some similar device whereby it can be moved by the operator.

In Figs. 3 and 4, I have illustrated the form of pulley forming the subject matter of my Letters Patent of the United States above referred to, and which forms no part of this invention, but which is briefly described in order that the improvement thereon may properly be understood. In these figures, 20 is an inner sleeve preferably made in two parts and secured to the shaft 2 by set screws 21, or in any other usual manner. Mounted on this sleeve, or directly upon the shaft, if desired are two carriers 22, each made of light flexible elastic metal, such as sheet steel, and preferably cut into a star like form, with radial arms 23 (as shown, especially in Fig. 4). Screws 24 serve to secure the carrier to the sleeve 20. Secured in turn to each carrier by bolts 25 is a conical drum 26 with its base, or larger end, turned inwardly and provided at its outer end with a lateral annular flange 27. These drums may be made of any suitable size and material. I prefer to make them of rings 28 of leather held in place by the bolts 25. When the driving pulley and the driven pulley are brought together (as shown, for example, in Fig. 5) the outer rim of the driven pulley 11, contacting with the outer rim of the drums 26 of the driving pulley 10, the drums are pressed inwardly, and being mounted on the flexible carriers 22, are pressed in that direction and move inwardly until the lateral flanges 27 contact with the sides of the driven pulley and a firm frictional engagement takes place between them.

In Figs. 5 to 9, there is shown an improvement whereby a locking engagement is secured between the pulleys in addition to the frictional engagement resulting from the construction shown in Fig. 3. In these Figs. 5 to 9, 30 indicates the outer side of the driven pulley 10. Parallel to and slightly back from the edge 31 of this pulley, is a row of teeth 32, preferably radially disposed and projecting outwardly from the side 30. 40 indicates the inner side of the lateral flange 27 on the driving pulley. Parallel to and slightly back from the edge 41 of this flange, is a row of indentations 42 radially disposed and corresponding in size and number to the teeth 32 on the driven pulley. The purpose of this construction is to secure a more certain engagement between the two pulleys. As the pulleys engage in the manner above described, and the proper surfaces are brought into closer and closer contact, finally the inward movement of the annular flange on the driven pulley will cause the teeth 32 to engage with the indentations 42 to make a positive locking engagement of the two pulleys while they are under such speed conditions that the annular flange of the driving pulley and the rim of the driven pulley are in sufficiently close contact to enable this to take place. As the speed slackens, or the pulleys are caused to disengage, the teeth 32 readily disengage from the indentations 42 and the frictional engagement of the surfaces 31 and 40 alone remain, and as the speed becomes less these surfaces are finally disengaged and the transmission of power ceases.

From the construction above referred to, it will be seen that power is transmitted from the driving to the driven pulley at once and automatically just as soon as the pulleys are brought into contact. When the parts are in inoperative positions, (as shown in Fig. 10), the brake 13 is against the rim of the driven pulley and is held by the weight of the motor which is to the left of the center of its base. This movement is assisted by the tension of the spring 5. At the same time the switch arm 6 is out of contact with the energizing conductor 7. Now, if the operator pulls down upon the rod 15, either by his foot or his hand, such movement tends to oscillate the motor into the position shown in Fig. 2. By this movement the brake 13 is simultaneously removed from contact with the driven pulley and the switch-arm 6 is brought into contact with the energizing conductor 7, the motor is thereby energized and the pulleys brought into contact, as has been heretofore described, and thereby the energy of the motor is communicated from them to the machine actuated from the shaft 12.

Having described my invention, what I claim as new is:—

1. The combination with a base or support, of a motor, a shaft mounted thereon, a driving pulley on the shaft, a machine, a shaft mounted thereon parallel with the motor shaft, a driven pulley thereon, and a pivotal support connecting the motor with the base, said pivotal support being parallel with the shafts of the motor and the machine and located in a vertical plane between the vertical planes of said shafts.

2. The combination with a base or support, of a motor, a shaft mounted thereon, a driving pulley on the shaft, a machine, a shaft mounted thereon parallel with the motor shaft, a driven pulley thereon, a pivotal support connecting the motor with the base, said pivotal support being parallel with the shafts of the motor and the machine and located in a vertical plane between the vertical planes of said shafts, a spring connecting the motor with the base on one side of the pivot, and means operating on the motor on the opposite side of the pivot to move it toward the machine.

In testimony whereof I affix my signature in presence of two witnesses.

FREDERICK BUCHERER.

Witnesses:
HERMAN MEYER,
ALAN C. MCDONNELL.